United States Patent [19]

Muranaga

[11] Patent Number: 4,803,642

[45] Date of Patent: Feb. 7, 1988

[54] INFERENCE SYSTEM

[75] Inventor: Tetsuro Muranaga, Tokyo, Japan

[73] Assignee: Kabushiki Kaisha Toshiba, Kawasaki, Japan

[21] Appl. No.: 74,029

[22] Filed: Jul. 16, 1987

[30] Foreign Application Priority Data

Jul. 21, 1986 [JP] Japan ............................ 61-171081

[51] Int. Cl.$^4$ .................. G09B 7/12; G06F 12/00; G06F 7/00
[52] U.S. Cl. .................................. 364/513; 364/200; 364/900
[58] Field of Search ......... 364/513, 900 MS, 200 MS, 364/300

[56] References Cited

U.S. PATENT DOCUMENTS

| | | | |
|---|---|---|---|
| 4,648,044 | 3/1987 | Hardy et al. | 364/300 |
| 4,670,848 | 6/1987 | Schramm | 364/513 |
| 4,675,829 | 6/1987 | Clemenson | 364/513 |
| 4,697,242 | 9/1987 | Holland et al. | 364/513 |
| 4,704,695 | 11/1987 | Kimura et al. | 364/900 |

OTHER PUBLICATIONS

Shortliffe, EH.: Computer-Based Medical Consultations, MYCIN Chap 3. pp. 98-101, American Elsevier, 1976.

Primary Examiner—Jerry Smith
Assistant Examiner—Paul Gordon
Attorney, Agent, or Firm—Oblon, Fisher, Spivak, McClelland & Maier

[57] ABSTRACT

According to this invention, an attribute of an object and a relation of the object with another object is expressed by a paired set of an attribute name and its attribute value. A knowledge base of the frame type is used. In the knowledge base, the attribute of objects and the relation among different objects are expressed in terms of the attribute name/attribute value set, and framed and stored for each objects. The knowledge base is weighted depending on the strength of the attribute of the object and the strength of the relation between different objects. An inference processing unit accesses the knowledge base, and extracts the strong attribute or the strong relation whose strength is presented by the weight, and obtains the interference result. Knowledge can be accessed in a natural way, based on the strength of the relation between objects and the strength of the attributs of the objects, thus enabling a flexible and high-speed infernece processing.

9 Claims, 12 Drawing Sheets

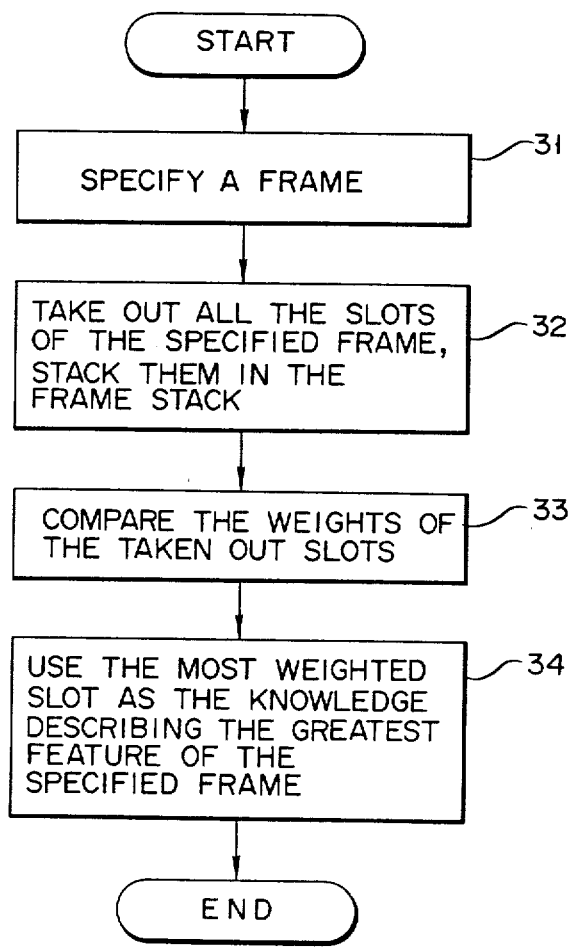
F I G. 6

(i) INITIAL STATE spitz
bark(0) : yes
bark(0) : no

⇩

(ii) TO PREPARE TEN SAMPLES OF SPITZ spitz
bark(9) : yes
bark(1) : no has-instance

| Andy | John | Jack | Betty |
|---|---|---|---|
| bark : yes | bark : yes | bark : yes | bark : no |

NINE SAMPLES — ONE SAMPLE

⇩

(iii) TO LEARN THE CONCEPT THAT "ALMOST ALL THE SPITZES BARK"

spitz
almost-all-bark : yes
bark(9) : yes
bark(1) : yes

F I G. 10

INFERENCE SYSTEM

BACKGROUND OF THE INVENTION

This invention relates to an inference system that executes the inference process, using a knowledge base in which knowledge about various objects is distributed to frames.

In the field of AI (Artificial Intelligence), such as the expert systems, a knowledge representation system is required which can flexibly describe knowledge about certain objects or concepts, and is suitable for accessing, controlling and managing that knowledge easily.

As one of such knowledge representation systems, a frame system is known in which knowledge about various objects is categorized into frames. In the frame knowledge representation system, a frame of an object consists of several sets of slot-value pairs. The slot represents the attribute of that object, e.g., color, weight, "is-a" and "have". The value indicates an attribute value of that object, e.g., white and 50 g, or the names of other objects, e.g. dog. In the frame representation system, knowledge is stored in a way similar to the structure of human knowledge. The frame representation system can describe knowledge in details and in various ways.

In the inference system using a knowledge base which is based on frame system, the attributes of an object are searched by traversing the link of the "is-a" slot, when they do not exist in the frame of the object. In many cases, a frame has "significant attributes "and" not significant attributes" at the same time, and they exist in different links. And some objects are related to each other to different degrees.

However, the conventional inference system using the frame knowledge representation system cannot distinguish the strength of such attributes or relations among different objects. Conventional inference systems frequently fail to access certain simple knowledge that they should be expected to accomplish easily. Also in these systems, unexpected, irrelevant accessing of knowledge prevents the rapid execution of inference processing.

SUMMARY OF THE INVENTION

Accordingly, an object of this invention is to provide an inference system which can make a more "natural" access to knowledge about objects or concepts A further object of this invention is to provide an inference system which sets up an optimum inference procedure for various uses.

Another object of this invention is to provide an inference system which can execute the inference processing quickly.

According to this invention, there is provided an inference system comprising a knowledge base in which knowledge about objects, which includes the attributes of objects and the relations among objects that are described as "attribute name/attribute value" pairs, are stored in frames, and weighting values indicating the priority strength of the attributes and the relations are stored in connection with the "attribute name/attribute value" pairs; and an inference processing unit that accesses the knowledge base according to a given frame pattern for a search, retrieves the attributes and relations of objects on the basis of the priority weight values, and gets the result of inference.

BRIEF DESCRIPTION OF THE DRAWINGS

FIG. 6 shows a flowchart of the procedural steps to get the most significant feature of the specified frame;

FIG. 10 shows a diagram illustrating an example of learning by changing the weight dynamically;

DETAILED DESCRIPTION OF THE PREFERRED EMBODIMENT

Figure 1:
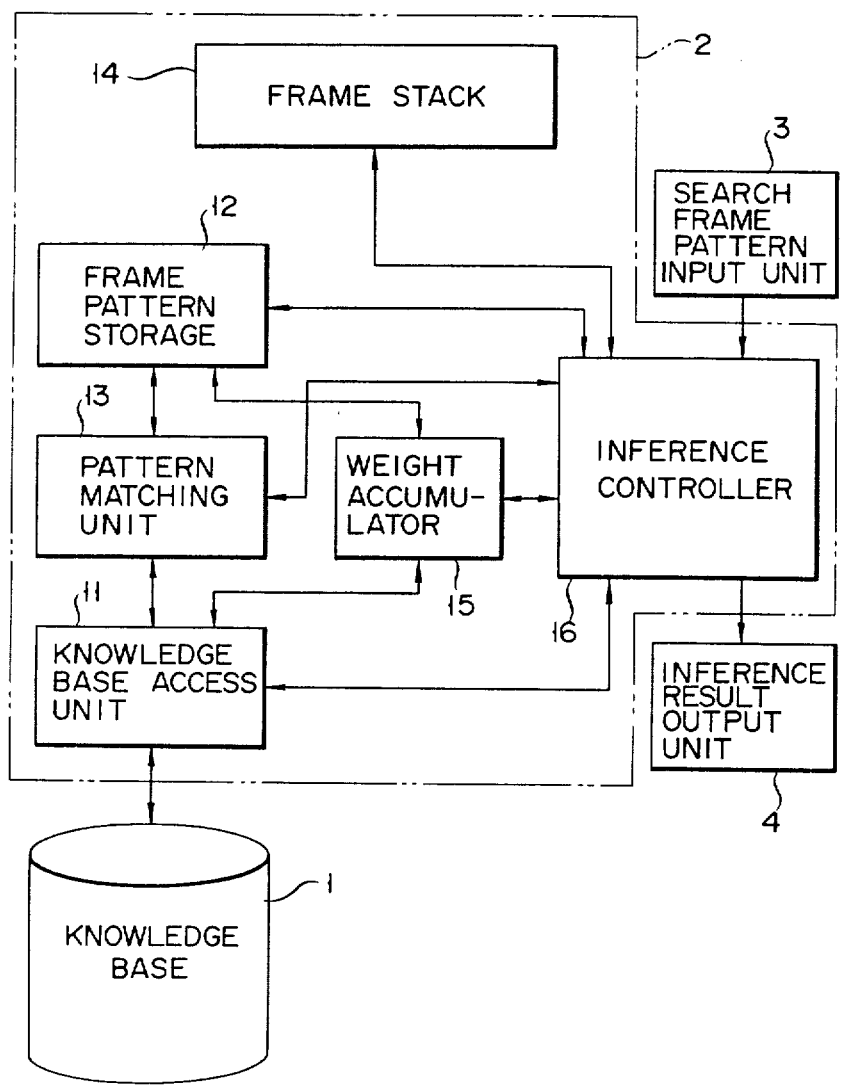
FIG. 1 shows a block diagram illustrating a structure of an expert system according to an embodiment of this invention.

FIG. 1 shows a block diagram of an embodiment of an inference system of this invention, when it is applied to an expert system.

The inference system comprises knowledge base 1, inference processing unit 2, search frame pattern input unit 3, and inference result output unit 4.

Figure 2:
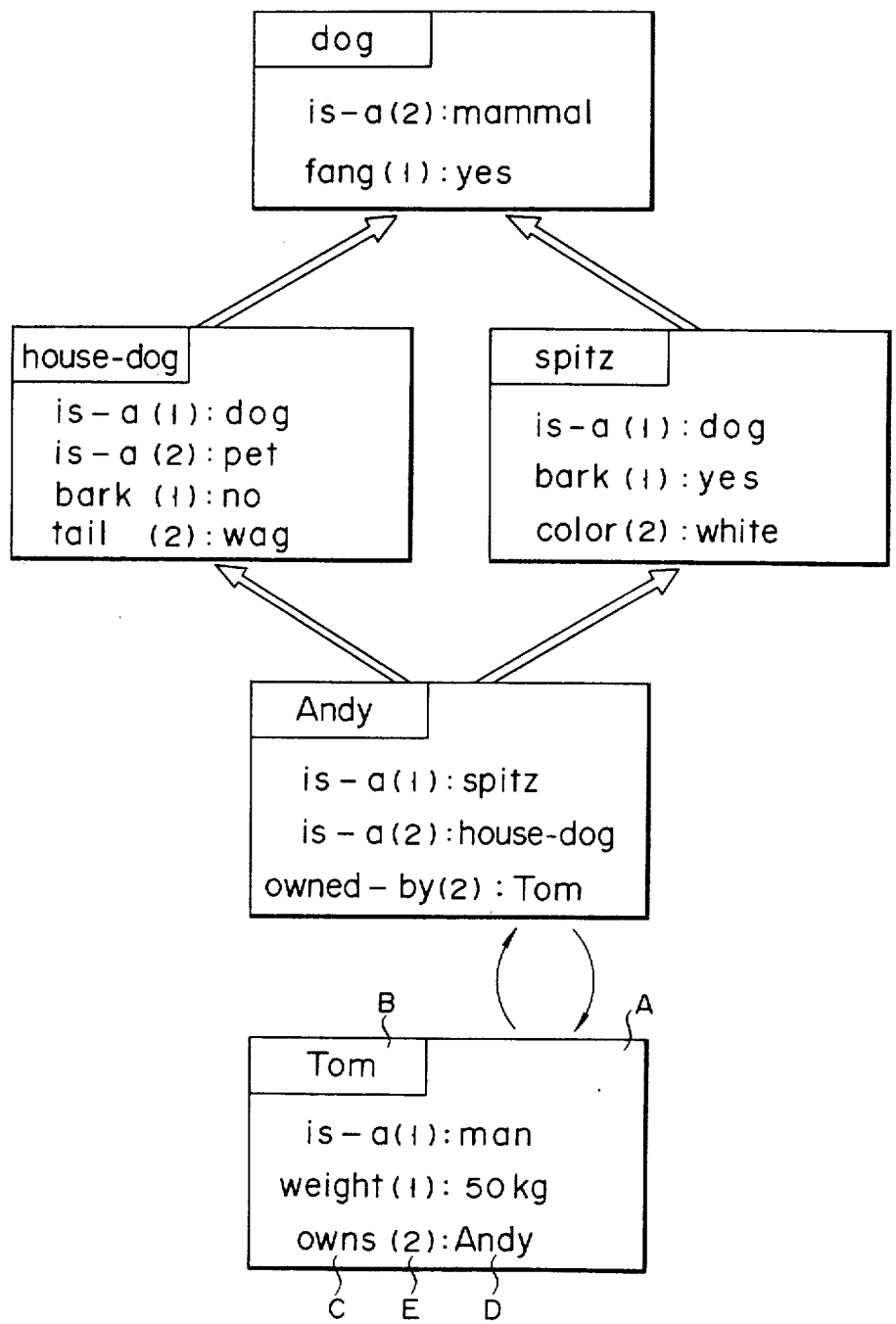
FIG. 2 shows the structure of a frame stored into the knowledge base in the expert system.

Knowledge base 1 stores knowledge in the form of frames. The knowledge of one object constitutes one unit of knowledge, and is arranged into one frame A, as shown in FIG. 2. Each frame A is given frame name B such as "dog", "spitz" or "Tom". Frame A includes several slot-value pairs. Slot C describes an attribute of the object (for example, "color" and "weight"), or the relation between the object and another object (for example, "is-a" and "owned-by"). Value D describes an attribute value (for example, "white" and "50 Kg") for the slot, or the name of the related object (for example, "dog" or "Tom"). Each slot C is assigned weight E. Weight E is data indicating the strength of an attribute of the object or the strength of the relation between different objects. The greater the E value, the stronger the attribute or the relation.

Figure 3:
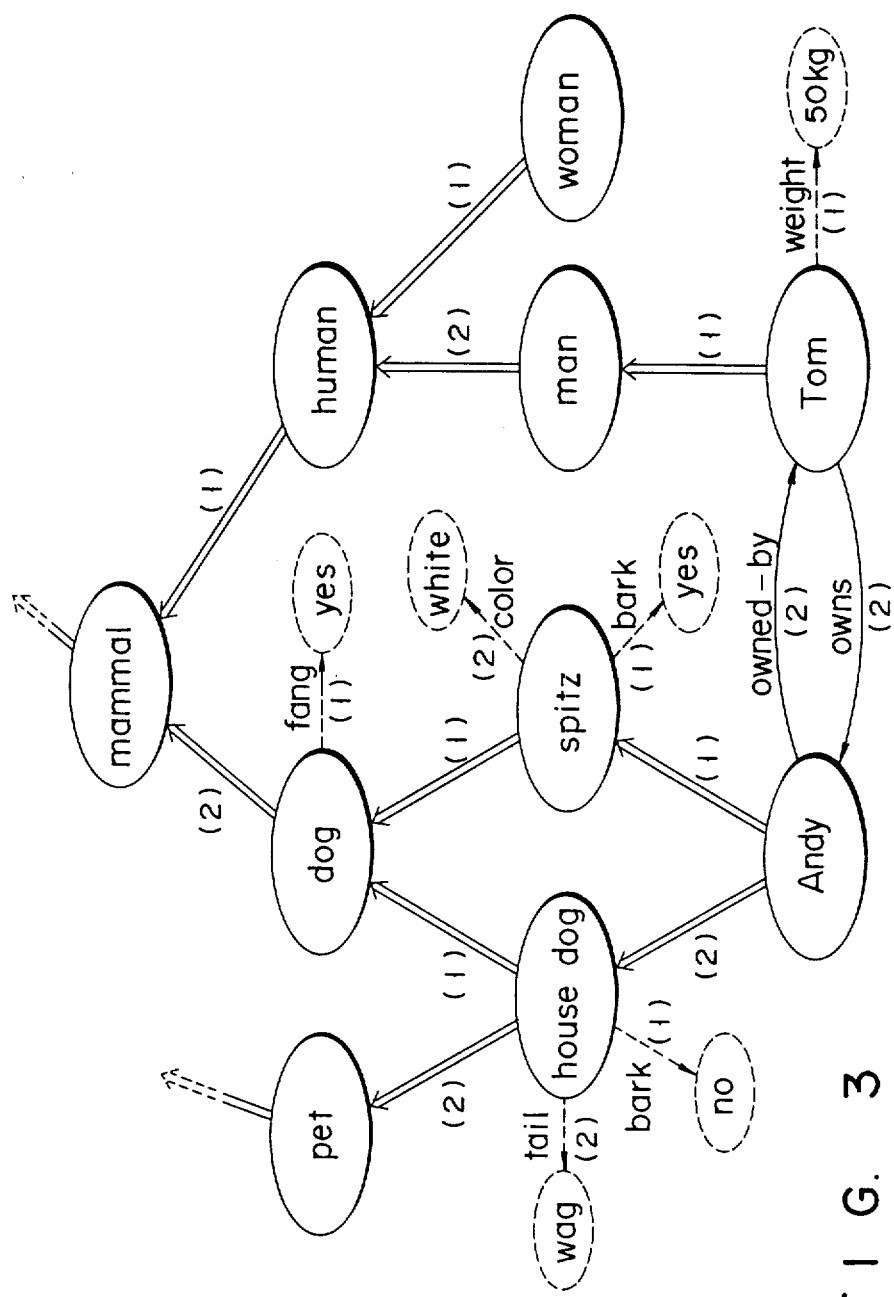
FIG. 3 shows a pattern of relations among objects, which is structured by hierarchically combining the frames.

FIG. 3 shows the relation among objects as represented by linking the objects by the slot-value pairs. Enclosed by a solid line ellipse is the name of an object which represents one unit of knowledge, and this is described by frame name B. Enclosed by a dotted line ellipse is an attribute value, and this is described by value D. If the frame name B of another frame A' is described in the value D of frame A, frame A and A' are related with each other, and are linked by a solid line arrow. If slot C of the frame A is the "is-a" slot, slot value D of the slot C represents the name of a frame as an object of generic concept for the frame A. Those related objects are linked especially by double solid line arrows. If slot D is not identical with the frame name B of any other object, the value D is the attribute specific to the object. This attribute is represented by a dotted line arrow. In the case of the objects akin to each other, by traversing the links of those objects, the relation and attribute of the generic object can be used as the attribute of the specific object. For example, in FIG. 3, "dog" and "spitz" are akin to each other. Therefore, "spitz" of specific concept can use the attribute "fang yes" of "dog" of generic concept as its own attribute.

Inference processing unit 2 receives a search frame pattern from search frame pattern input unit 3. Unit 2 makes an access to the knowledge base 1, on the basis of the search frame pattern. It executes the inference processing, which considers the priority by weights E, and gets the inference result. The inference result is output via inference result output unit 4. Inference processing unit 2 includes knowledge base access unit 11, frame pattern storage 12, pattern matching unit 13, frame stack 14, weight accumulator 15, and inference controller 16. Knowledge base access unit 11 performs the read and write of knowledge for knowledge base 1. Frame pattern storage 12 stores a search frame pattern, and frame patterns such as the generic of the search frame pattern or the like. Pattern matching unit 13 performs a matching process of the frame pattern stored in frame pattern storage 12 with the frame pattern read out by knowledge base access unit 11 from knowledge base 1. The matching result is output to inference controller 16. Frame stack 14 temporarily stores a frame during the pattern matching processing when comparison of weights E is performed. A stack is used here, but a linear memory may be used. Weight accumulator 15 compares the weight read out from knowledge base 1 with the weight specified in the search frame pattern and the weights of other read-out frames, and further performs the calculation of the weights. The result is transferred between weight accumulator 15 and inference controller 16. Inference controller 16 starts up knowledge base access unit 11 through pattern matching unit 13, and takes out an appropriate frame, changes the contents of the knowledge, on the basis of the search frame pattern as input via search frame pattern input unit 3. It further outputs the inference result and executes the processing of a new matching on the basis of the matching result of pattern matching unit 13 and the calculation result from weight accumulator 15 when the pattern matching process is executed. Additionally, the controller 16 causes it to execute the matching anew. In this embodiment, the frame pattern is retrieved by the method called "pattern matching". In this case, if the matching with the frame as fetched fails, the following operation is frequently performed; that frame is stacked in frame stack 14 to form a new frame linked with the frame, and the new frame is sent to frame pattern storage 12 for an additional matching.

Figure 4:
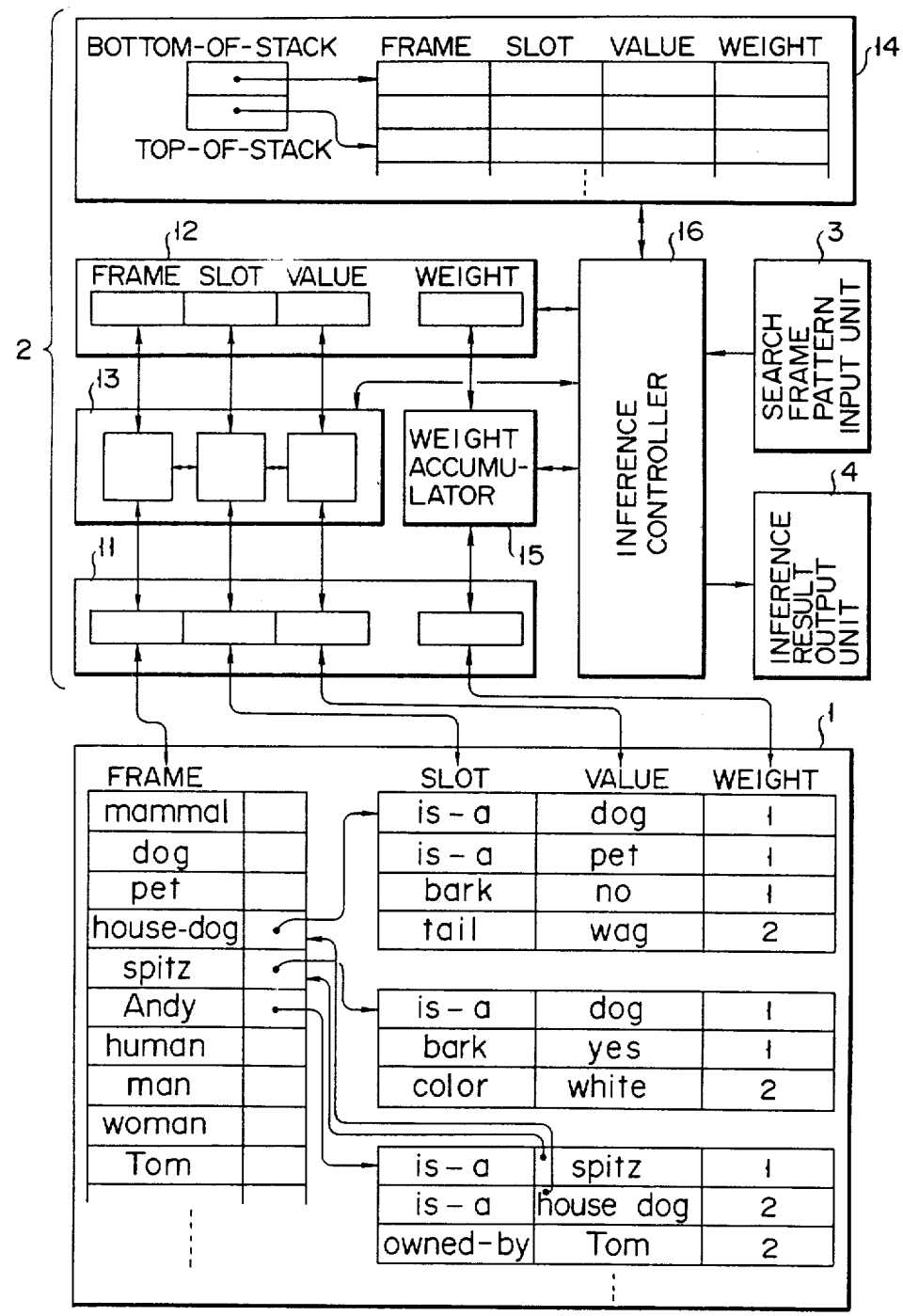
FIG. 4 shows a block diagram describing a flow of data in the expert system.

FIG. 4 shows the flow of data. In this system, the inference process is to check whether a given search frame pattern holds true, or to get a frame which matches the variable as a part of the pattern.

When a question "Andy bark?" is given to inference processing unit 2 via search frame pattern input unit 3, frame pattern storage 12 stores the pattern that is equivalent to the question. Inference controller 16 drives knowledge base access unit 11. Knowledge base access unit 11 sequentially reads out the frames from knowledge base 1, and executes the matching process of the read-out frames with the frame stored in frame pattern storage 12. When the frame "Andy" is searched, the slots are sequentially read out from the memory area designated by the pointer of the searched frame. Pattern matching unit 13 compares the read-out slots with the slot stored in frame pattern storage 12. In this example, since the frame "Andy" does not include the slot "bark", the matching process fails. Inference controller 16 temporarily stores the search frame pattern in frame stack 14. It then causes knowledge base access unit 11 to read out all the slots "is-a" of the frame "Andy". The read-out slots are all stacked in frame stack 14. Inference controller 16 compares the weights of the slots "is-a" stacked in frame stack 14, by weight accumulator 15. A value of the slot with the larger weight is used as a new frame name, and is sent to the frame unit frame pattern storage 12. In this case, two frame names of "spitz" and "house-dog" are candidates for the inference. Both frames have slots for "bark". However, the attribute "bark-no" of frame "house-dog" and the attribute "bark-yes" of frame "spitz" would give contradictory results. This would lead to the problem of which result to select. In the prior art, it is difficult to draw an inference result in such a case. According to this invention, inference controller 16 causes weight accumulator 15 to execute the comparing process, to show that the relation between "Andy" and "house-dog" is stronger than that between "Andy" and "spitz". It then performs the matching process for the "house-dog", selects "bark-no" as the attribute of "Andy". In this way, the inference result "Andy bark no" can be obtained.

Figure 5:
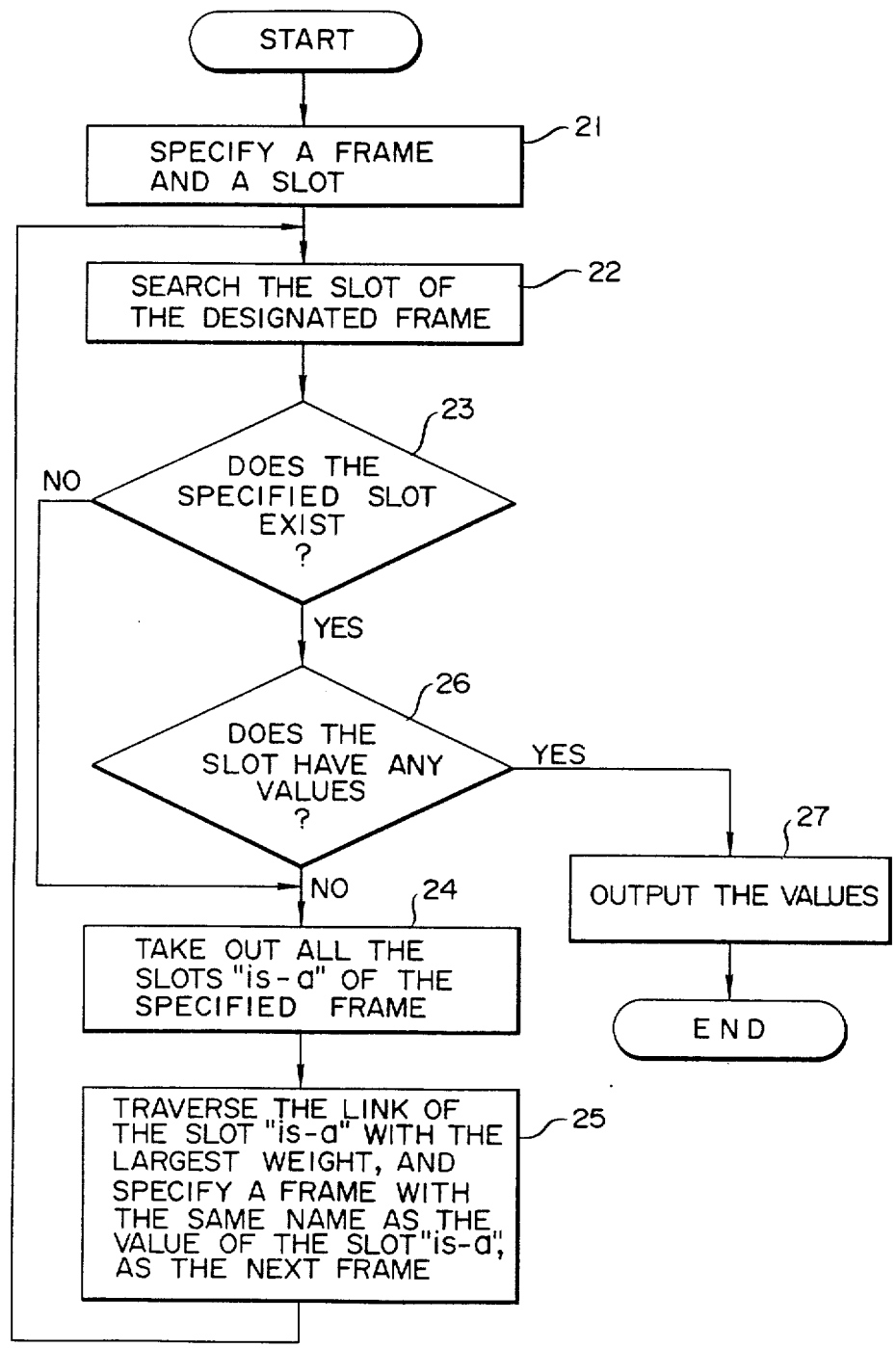
FIG. 5 shows a flowchart of the procedural steps to get slot values when the frame and the slot are specified.

FIG. 5 shows the procedural steps for the inference. The user specifies a frame and a slot that are relevant to the question (21). For a question "Does Andy bark yes or no?", the frame (Andy) and the slot "bark" are specified. Knowledge base access unit 11 searches the slots in the specified frame (Andy) (22), and checks the presence of the specified slot (bark) (23). If the the specified slot (bark) is not present in the frame (Andy), knowledge base access unit 11 reads out all the slots "is-a" for the specified frame (Andy) (24). Inference controller 16 checks the weights of the read-out slots "is-a", and successively replaces the slot values (house-dog) of the slot with new frame names in the order of weights from large to small (25). Inference controller 16 searches the specified slot (bark) in the new frame (22, 23). If the specified slot (bark) is found, pattern matching unit 13 checks whether the slot (bark) has a slot value or not (26). If it has a slot value, the slot value (no) is output (27). If not, inference controller 16 treats the secondly weighted value of the slot "is-a" as the newly specified frame (25), and a similar process is repeated.

As an alternative, all the links are traversed. The results are stacked in frame stack 14. All the weights stacked in frame stack 14 are taken out by inference controller 16. The weights are compared by a weight accumulator, to finally identify one link.

Another example of the inference procedure will be given. In this example, a problem about the attribute of "spitz" is given to ask which is stronger, "its color is white" or "it barks". The inference procedure is shown in FIG. 6. First, the user specifies a frame "spitz" and slots "color" and "bark" (31), and then the specified frame patterns are all stacked in frame stack 14. Inference controller 16 takes out all the specified slots "color" and "bark" and weights in the specified frame "spitz" (32). Weight accumulator 15 compares all the weights of the specified slots as taken out (33). Inference controller 16 decides that the slot "color" of the largest weight is the knowledge describing the greatest feature of the specified frame "spitz" (34). Thus, the reference result is obtained to the effect that "the feature of a spitz lies in that its color is white rather than in that it barks".

Figure 7:
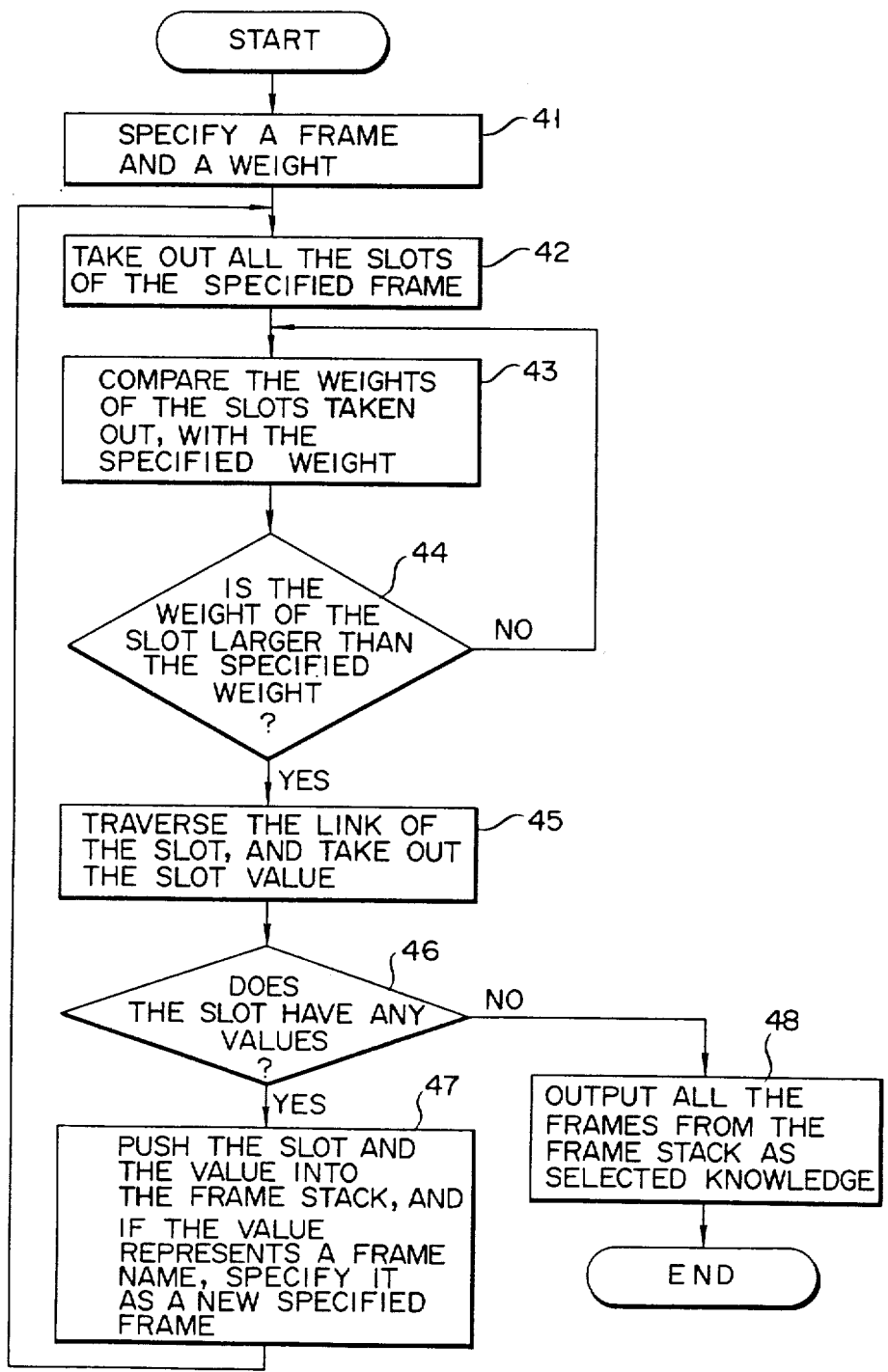
FIG. 7 shows a flowchart of the procedural steps to retrieve only the knowledge that is represented by a specific in the frame.

Yet another inference process of previously specifying weights of slots will now be described with reference to FIG. 7. In this example, only the frames containing slots with weights of 2 or more, viz, only the frames necessary for an object of use, are picked up. First, the user specifies a frame and a weight (41), and then the weight is set in frame pattern storage 12. Knowledge base access unit 11 takes out all the slots of the specified frame (42). Weight accumulator 15 compares the weights of the taken-out slots with the specified weight (43). If the weight of the taken-out slot is smaller than the specified weight, another slot is taken out (42). If the weight is larger than the specified weight, the link of the slot is traversed, and its slot value is taken out (45). If the slot value is present (46), the associated slot-value pair is stored in frame stack 14. If the slot value represents another frame name, the frame name is set as the name of the next specified frame (47). If the slot value is not present, the frame stacked in frame stack 14 is taken out as the selected knowledge (48).

Thus, the above case realizes a high speed inference processing using only the necessary knowledge in a manner that each slot is previously weighted according to the aims of use, and in use, only the necessary knowledge is fetched.

While the weight is fixed in the above instances, it may be changeable according to a situation of knowledge use. For example, in FIG. 3, for use of the general knowledge about "Tom", the weight of slot "weight" is increased, while for use of the more specific knowledge, i.e., that related to "Andy", the weight of slot "owned-by" is increased.

An additional inference process will be described referring to FIGS. 8 and 9. In this inference process, the addition and subtraction operations of weights are used in addition to the comparison.

Figure 8:
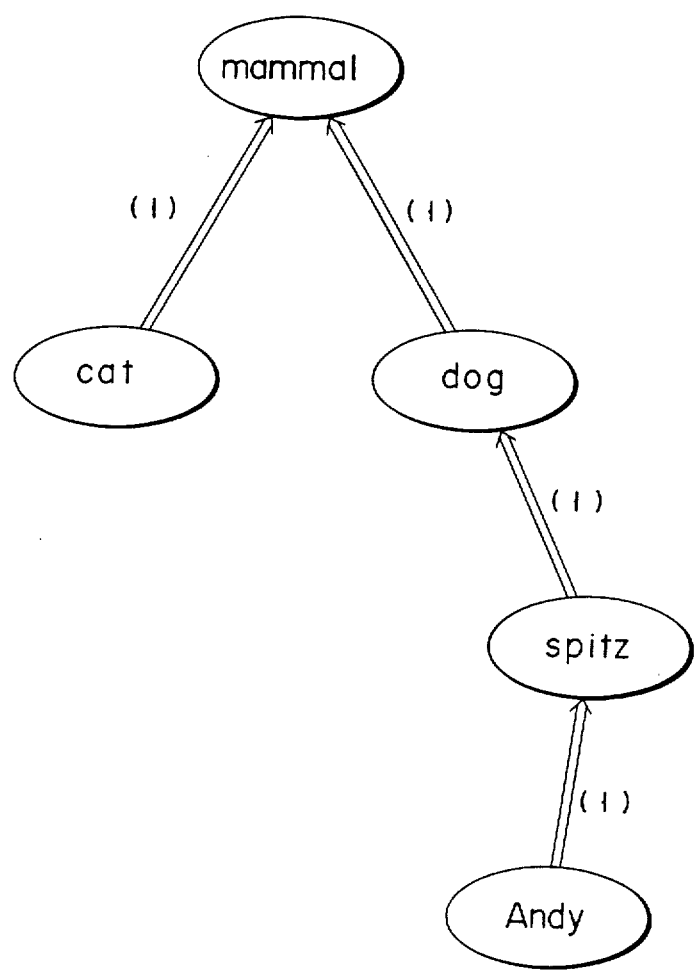
FIG. 8 illustrates a conceptual relation among objects and weights.

In FIG. 8, the objects are linked by the link "is-a". From "Andy is-a spitz" and "Spitz is-a dog", "Andy is-a dog" is obtained. The strength of the relation between "Andy" and "spitz" and that of the relation between "spitz" and "dog" are respectively represented as the weight of 1. Therefore, the strength of the relation between "Andy" and "dog" is determined as the weight of 1+1=2. Similarly, the strength of the relation between "Andy" and "mammal" is determined by the weight of 3. Here, the smaller the weight, the more specific the relation, and the larger the weight, the more general the relation. Therefore, when we have the three answers;

"Andy is-a (1) spitz"
"Andy is-a (2) dog"
"Andy is-a (3) mammal", a natural answer can be obtained if a more specific answer is selected.

Figure 9:
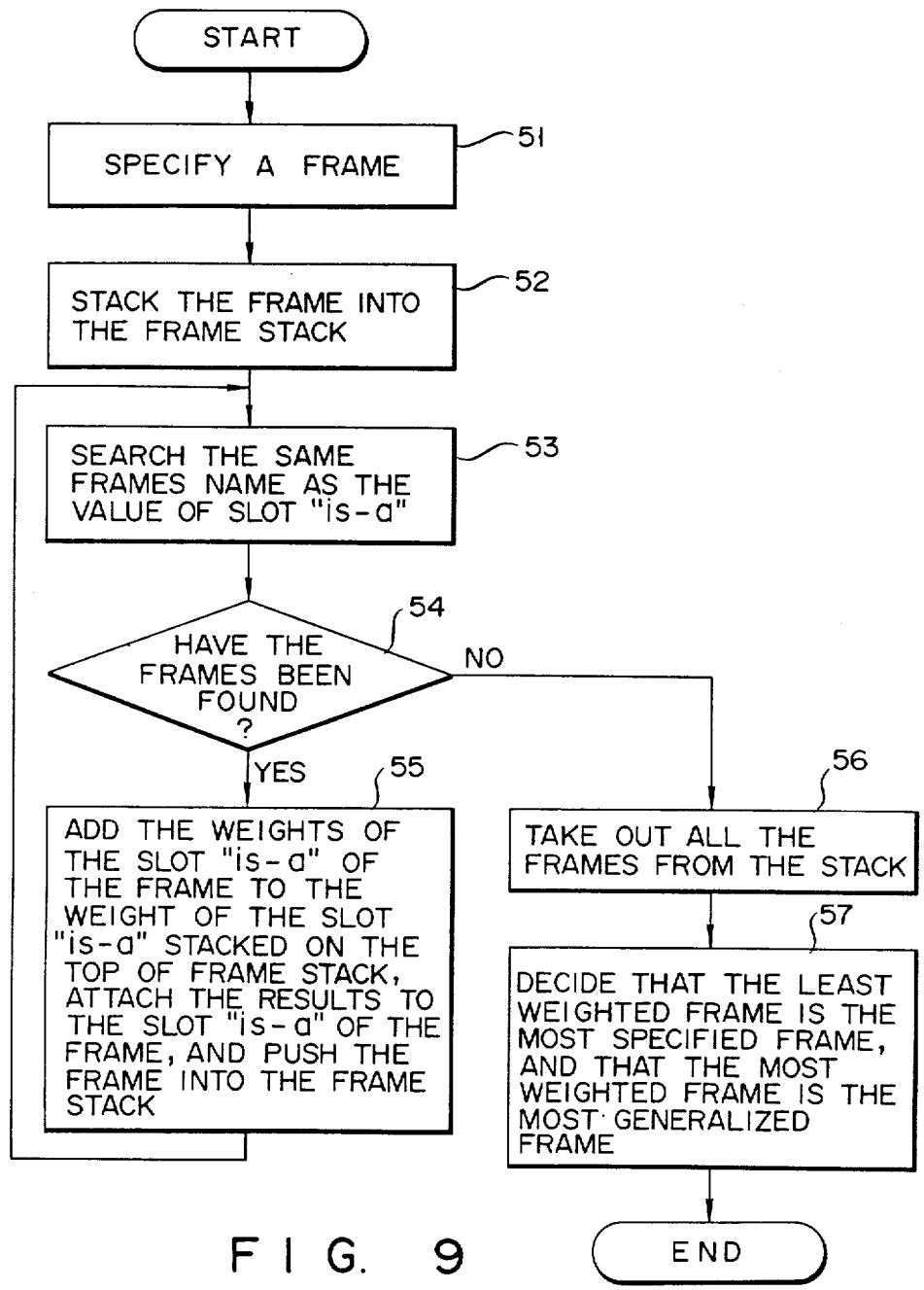
FIG. 9 shows a flowchart for distinction between a generalized concept and a specialized concept.

FIG. 9 shows the steps for the above inference process. When the user specifies a frame (51), the specified frame is stacked in frame stack 14 (52). Inference controller 16 starts up knowledge base access unit 11 and pattern matching unit 12, to search the specified frames which are the same as the values of slots "is-a" (53). If such frames are found (54), inference controller 16 adds the weights of the slots "is-a" to the weight of the slot "is-a" stacked on the top of frame stack 14, by using weight accumulator 15. The weight sum thus obtained is attached to the search frames (55), and stacked in frame stack 14. If all the frames have been found (54), inference controller 16 takes out all the frames stacked in frame stack 14 (56), and decides that the frame with the smallest weight is the most specified frame, and that the frame with the largest weight is the most generalized frame (57).

As described above, according to this invention, the weights of slots can be used flexibly, because in the weight operation, the addition/subtraction as well as the comparison is performed according to the state of the knowledge base or the use of it.

A further case will be described, in which the acquisition and learning of knowledge are performed by appropriately changing the weight of the slot in the knowledge base on the basis of inference result.

Figure 11:
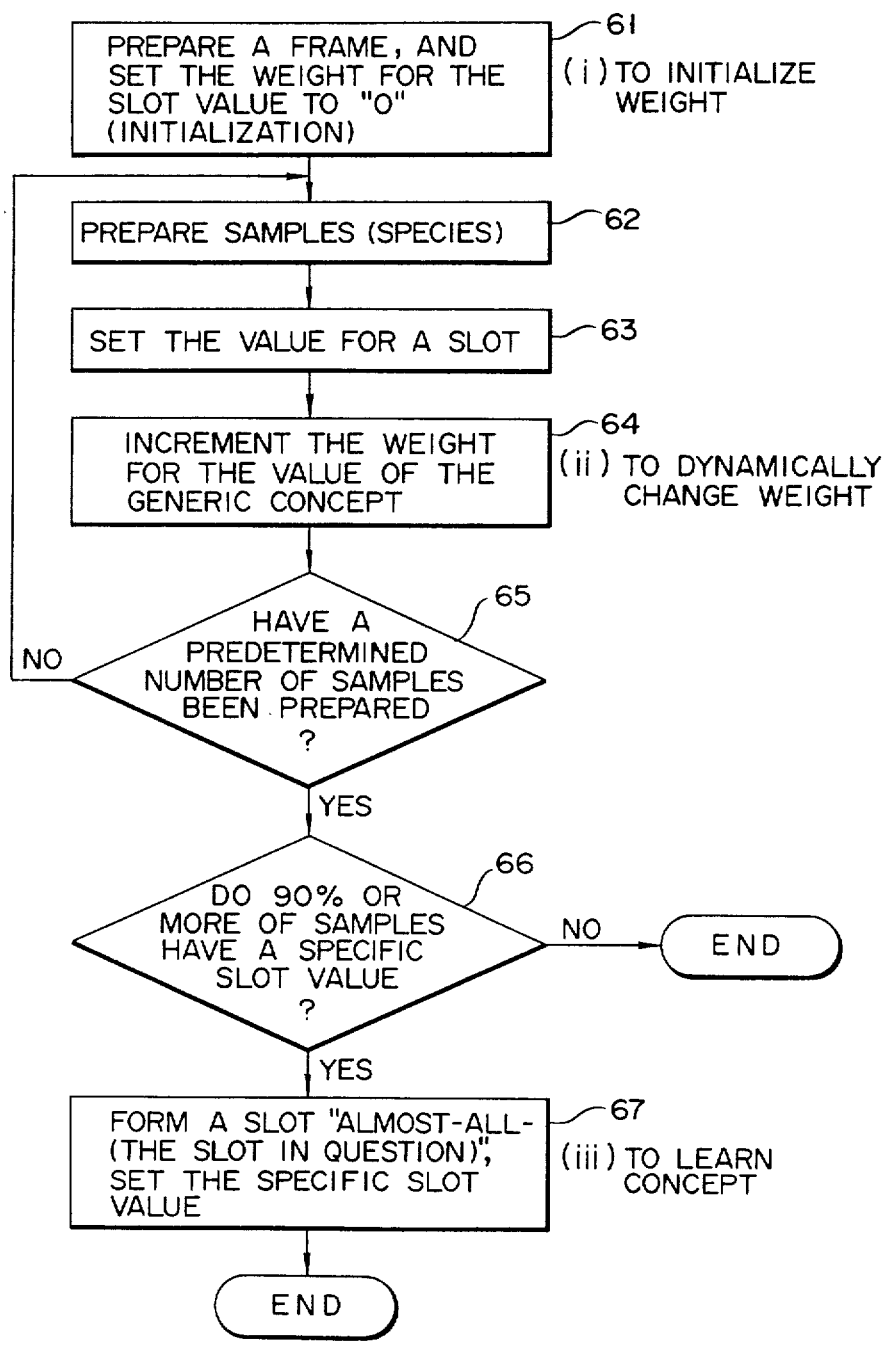
FIG. 11 shows a flowchart illustrating the learning process by changing the weight dynamically.

In the example shown in FIG. 10, to acquire knowledge as to "Does spitz bark, yes or no?", learning is performed based on ten samples of spitz. FIG. 11 shows the procedural steps for learning. First of all, a certain frame representing a concept (spitz) is set in frame pattern storage 12. The weight of the slot (bark) is set to 0 (61). In the FIG. 10 example, 0 is set as a weight for both values "yes" of the slot "bark" and value "no" of the slot "bark". Next, some samples (here, ten) of the concept (spitz) are prepared (62). A value, yes or no, is set for the slots of the examples (63). At the same time, weight accumulator 15 increments one by one the weights assigned to the slot value, which are equal to the set value, of the generic frame (spitz) (64). For example, when the sample "Andy" is prepared, if Andy barks, the weight attached to the slot "bark-yes" of the frame "spitz" is incremented by 1. In the sample "Betty", if Betty does not bark, the weight attached to the slot "bark-no" of the frame "spitz" is incremented by 1. In this way, the weights for the slot "bark" are dynamically changed. When a predetermined number of samples are prepared, the control enters a phase for learning (65). In the FIG. 10 example, the slot-value pairs for bark-yes/no are set for ten samples, and in this case, "bark- yes" is for nine samples and "bark- no" is for one sample. If a certain feature exists in the samples of 90% or more (66), it is decided that almost all the samples possess the feature in the generic concept. The slot "almost-all-<slot in question>" is created, and the fetched slot value is set to the slot (67). In the FIG. 10 example, the slot "almost-all-bark" of the frame "spitz" is created, and the value "yes" is set as a slot value (67). Through the above operation, the concept "almost all spitzes bark" is learned. In this example, the learning is performed based on the statistic values of samples.

Figure 12:
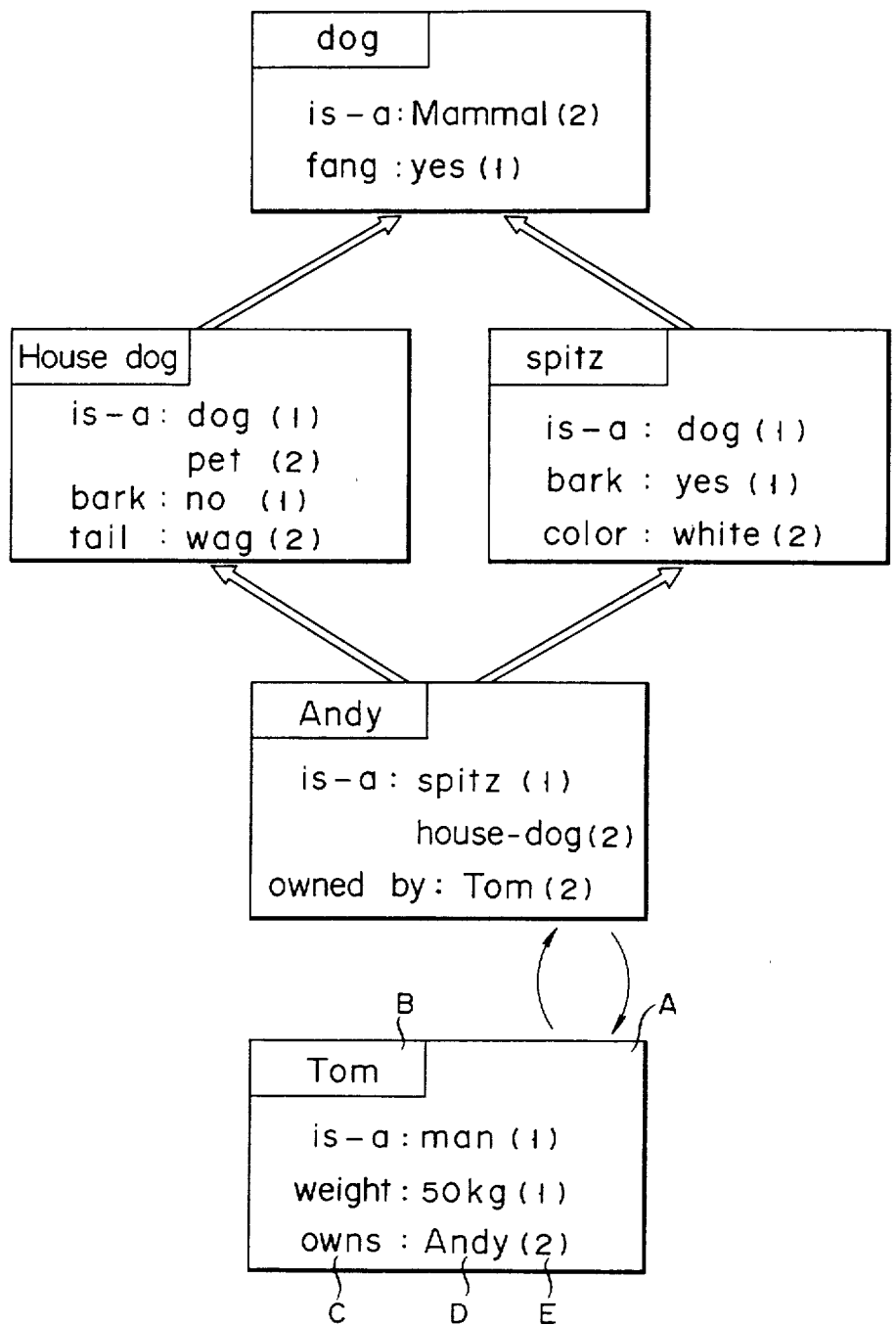
FIG. 12 shows a diagram illustrating a frame structure when the weight data is attached to the slot value.

The weight data may be assigned to either the slot (FIG. 3) or the slot value (FIG. 12).

This invention is not limited to the application for the expert system, but is widely applicable to other information processing systems, such as a data base system and natural language processing system.

As seen from the foregoing, according to this embodiment, attribute data of objects and the relation data among different objects in the frame are weighted. Therefore, knowledge can be represented in a natural way, on the basis of the strength of the relation between objects and the strength of the attributes of the objects. Moreover, an access to the knowledge can be controlled in accordance with values of the attached weights. This feature enables one to flexibly and quickly access to the desired knowledge.

What is claimed is:

1. An inference system comprising:

a knowledge base storing knowledge about objects, each of said objects being described by a frame comprising plural sets of slot-value pairs which represent an attribute of the respective object or a relation between the respective object and another object and to which a weight indicating the semantic strength of said attribute or said relation is assigned; and, an inference processing unit for receiving a search frame pattern, said inference processing unit accessing said knowledge base on the basis of the search frame pattern, and executing an inference process in accordance with a specified frame specified by the search frame pattern or specified by a frame of a generic concept whose slot-value pairs are inherited by said specified frame, and also in accordance with a priority defined by said weight, thereby to obtain the results of said inference process.

2. The inference system according to claim 1, wherein said inference processing unit receives a frame and several slot-value pairs, as a search frame pattern, and works out the slot-value pair describing the greatest feature of said input frame as the inference result.

3. The inference system according to claim 1, wherein said inference processing unit receives a weight as a search frame pattern, and retrieves a frame having a strength of weight more than that of the input weight from said knowledge base.

4. The inference system according to claim 3, wherein said weight takes different values, with aims of use.

5. The inference system according to claim 1, wherein said inference processing unit receives a frame as a search frame pattern, and obtains the inference result, differently recognizing the generic concept and the specific concept of the frame linked with said input frame, the former being generic for the latter.

6. The inference system according to claim 5, wherein said weights are added together each time the link is traversed.

7. The inference system according to claim 1, wherein:

the weight for specific slot-value pairs included in a specific frame is determined by the number of said specific slot-value pairs existing in the frames which are species of said specific frame.

8. An inference system comprising:

a knowledge base storing knowledge about a plurality of objects, each of said plurality of objects being described by a frame comprising several sets of slot-value pairs which represent an attribute of the respective object or a relation between each object and another object and to which a weight indicating the semantic strength of said attribute or said relation is assigned;

search frame pattern input means for inputting a search frame pattern;

knowledge base access means for accessing said knowledge base;

frame pattern storage means for storing said search frame pattern;

pattern matching means for comparing said search frame pattern stored in the frame pattern storage means with a frame pattern which is read out of said knowledge base by said knowledge base access means;

frame stack means for temporarily storing a frame pattern during the matching process by the pattern matching means;

weight accumulator means for performing weight comparison and calculation;

inference controller means for controlling said pattern including means and said knowledge base access means and selecting a frame pattern as an inference result based upon frame patterns stored in said frame stack means and a calculated result of said weight accumulator means; and inference result output means for outputting the inference result.

9. An inference system comprising:

a knowledge base in which knowledge about objects containing an attribute of each of said objects and a relation of each object among said objects as described in terms of slot-value pairs is framed and stored for each of said objects, and weights indicating a strength of said attribute and said relation are stored in connection with said slot-value pairs;

an inference processing unit for receiving a search frame pattern, accessing said knowledge base according to the search frame pattern, and retrieving an attribute and a relation of a particular object on the basis of weight for purposes of obtaining an inference result;

said inference processing unit receiving a frame as a search frame pattern, obtaining the inference result and differently recognizing a generic concept and a specific concept of the frame linked with said input frame, the former being generic for the latter; and, said weights being added together each time the link is traversed.

* * * * *

UNITED STATES PATENT AND TRADEMARK OFFICE
CERTIFICATE OF CORRECTION

PATENT NO. : 4,803,642
DATED : February 7, 1989
INVENTOR(S) : Tetsuro MURANAGA

It is certified that error appears in the above-identified patent and that said Letters Patent is hereby corrected as shown below:

The issue date of the Patent is Feb. 7, 1989, not 1988.

Signed and Sealed this

Eighth Day of August, 1989

Attest:

DONALD J. QUIGG

Attesting Officer

Commissioner of Patents and Trademarks